(12) United States Patent
Rudelic et al.

(10) Patent No.: US 9,317,450 B2
(45) Date of Patent: Apr. 19, 2016

(54) SECURITY PROTECTION FOR MEMORY CONTENT OF PROCESSOR MAIN MEMORY

(71) Applicant: MICRON TECHNOLOGY, INC., Boise, ID (US)

(72) Inventors: John Rudelic, Folsom, CA (US); August Camber, Rocklin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/107,686

(22) Filed: Dec. 16, 2013

(65) Prior Publication Data

US 2014/0108823 A1 Apr. 17, 2014

Related U.S. Application Data

(63) Continuation of application No. 12/895,574, filed on Sep. 30, 2010, now Pat. No. 8,613,074.

(51) Int. Cl.
  *H04L 29/06* (2006.01)
  *G06F 12/14* (2006.01)

(52) U.S. Cl.
  CPC ........ *G06F 12/1408* (2013.01); *G06F 12/1466* (2013.01)

(58) Field of Classification Search
  CPC .................................. G06F 8/665; G06F 21/64
  USPC ......................................................... 713/193
  See application file for complete search history.

(56) References Cited

U.S. PATENT DOCUMENTS

| | | | |
|---|---|---|---|
| 5,442,704 | A | 8/1995 | Holtey |
| 5,778,429 | A | 7/1998 | Sukegawa et al. |
| 6,003,142 | A | 12/1999 | Mori |
| 6,625,756 | B1 | 9/2003 | Grochowski et al. |
| 6,658,539 | B2 | 12/2003 | Arimilli et al. |
| 6,807,615 | B1 | 10/2004 | Wong et al. |
| 6,952,797 | B1 | 10/2005 | Kahn et al. |
| 7,017,022 | B2 | 3/2006 | Jeddeloh |
| 7,035,987 | B2 | 4/2006 | Rudelic |
| 7,103,718 | B2 | 9/2006 | Nickel et al. |
| 7,269,608 | B2 | 9/2007 | Wong et al. |
| 7,761,625 | B2 | 7/2010 | Karamcheti et al. |
| 7,917,812 | B2 | 3/2011 | Ginggen et al. |
| 8,055,847 | B2 | 11/2011 | Cantin, Jr. |
| 8,055,852 | B2 | 11/2011 | Resnick |
| 8,180,981 | B2 | 5/2012 | Kapil et al. |
| 8,296,496 | B2 | 10/2012 | Mogul et al. |

(Continued)

FOREIGN PATENT DOCUMENTS

| | | |
|---|---|---|
| CN | 1122163 | 5/1996 |
| CN | 1504902 | 6/2004 |

(Continued)

OTHER PUBLICATIONS

Chinese Office Action dated Jan. 13, 2014 in corresponding Chinese Patent Application 201110303764.4, filed Sep. 29, 2011, 32 pages.

(Continued)

*Primary Examiner* — Jason K Gee
(74) *Attorney, Agent, or Firm* — Brooks, Cameron & Huebsch, PLLC

(57) ABSTRACT

Subject matter disclosed herein relates to memory devices and security of same.

21 Claims, 5 Drawing Sheets

(56) References Cited

U.S. PATENT DOCUMENTS

| | | | |
|---|---|---|---|
| 8,694,737 | B2 | 4/2014 | Rudelic et al. |
| 2003/0005237 | A1 | 1/2003 | Dhong et al. |
| 2004/0158742 | A1* | 8/2004 | Srinivasan et al. ............ 713/201 |
| 2004/0242029 | A1* | 12/2004 | Nakamura et al. .............. 439/66 |
| 2005/0160229 | A1 | 7/2005 | Johns et al. |
| 2005/0166020 | A1 | 7/2005 | Jamil et al. |
| 2006/0026569 | A1* | 2/2006 | Oerting et al. ................ 717/126 |
| 2006/0126422 | A1 | 6/2006 | Takagi et al. |
| 2006/0156064 | A1* | 7/2006 | Damani et al. .................. 714/16 |
| 2006/0265544 | A1* | 11/2006 | Rudelic ......................... 711/103 |
| 2006/0271755 | A1* | 11/2006 | Miura ............................ 711/165 |
| 2007/0061581 | A1 | 3/2007 | Holtzman et al. |
| 2007/0113044 | A1 | 5/2007 | Day et al. |
| 2007/0136607 | A1 | 6/2007 | Launchbury et al. |
| 2007/0136609 | A1 | 6/2007 | Rudelic et al. |
| 2007/0226795 | A1 | 9/2007 | Conti et al. |
| 2008/0082766 | A1 | 4/2008 | Okin et al. |
| 2008/0282128 | A1 | 11/2008 | Lee et al. |
| 2008/0320224 | A1 | 12/2008 | Kiyota |
| 2009/0037666 | A1 | 2/2009 | Rahman et al. |
| 2009/0158000 | A1 | 6/2009 | Takahashi |
| 2009/0307444 | A1 | 12/2009 | Cyr et al. |
| 2009/0313416 | A1 | 12/2009 | Nation |
| 2010/0058046 | A1 | 3/2010 | John et al. |
| 2010/0064111 | A1 | 3/2010 | Kunimatsu et al. |
| 2010/0211742 | A1 | 8/2010 | Turullols et al. |
| 2010/0293317 | A1 | 11/2010 | Confalonieri et al. |
| 2011/0066790 | A1 | 3/2011 | Mogul et al. |
| 2011/0093646 | A1 | 4/2011 | Koka et al. |
| 2012/0084573 | A1 | 4/2012 | Rudelic et al. |

FOREIGN PATENT DOCUMENTS

| | | |
|---|---|---|
| CN | 1864140 | 11/2006 |
| CN | 101131624 | 2/2008 |
| JP | 03-058163 | 3/1991 |
| JP | 6-150031 | 5/1994 |
| JP | 08-016740 | 1/1996 |
| JP | 8-95861 | 12/1996 |
| JP | 10-161930 | 6/1998 |
| JP | 2004-521434 | 7/2004 |
| JP | 2004-334996 | 11/2004 |
| JP | 2005-182525 | 7/2005 |
| JP | 2006-31097 | 2/2006 |
| JP | 2006-323739 | 11/2006 |
| JP | 2009-75913 | 4/2009 |
| JP | 2009-295156 | 12/2009 |
| KR | 10-2002-0097145 | 12/2002 |
| KR | 10-2010-0053540 | 5/2010 |
| TW | 200622905 | 7/2006 |
| TW | 200710722 | 3/2007 |
| TW | 200731108 | 8/2007 |
| TW | 201017408 | 5/2010 |
| TW | 201017421 | 5/2010 |
| WO | WO 01/50269 | 7/2001 |
| WO | WO 2006/107095 | 10/2006 |
| WO | WO 2007/105256 | 9/2007 |
| WO | WO 2009/017890 | 2/2009 |

OTHER PUBLICATIONS

Japan Notice of Rejection Grounds dated Jun. 18, 2013 in corresponding Japanese Patent Application 2011-175264, filed Aug. 10, 2011, 8 pages.

Korean Office Action dated Jan. 28, 2013 in corresponding Korean Patent Application 10-2011-98780, filed Sep. 29, 2011, 4 pages.

Korean Office Action dated Aug. 16, 2013 in corresponding Korean Patent Application 10-2011-98780, filed Sep. 29, 2011, 8 pages.

Taiwanese Office Action dated Dec. 24, 2013 in corresponding Taiwanese Patent Application 100127253, filed Aug. 1, 2011, 15 pages.

Desikan, Rajagopalan, "On-chip MRAM as High-Bandwidth, Low-Latency Replacement for DRAM Physical Memories," Nov. 27, 2002, Department of Computer Sciences, University of Texas at Austin.

U.S. Appl. No. 12/797,512, filed Jun. 9, 2010, 32 pages.

U.S. Appl. No. 12/797,522, filed Jun. 9, 2010, 35 pages.

U.S. Appl. No. 12/895,627, filed Sep. 30, 2010, 37 pages.

Intel "An Introduction to the Intel® QuickPath Interconnect" Jan. 2009, pp. 1-22, Document No. 320412-001US, Intel Corporation.

Lee, B.C. et al., "Phase-Change Technology and the Future of Main Memory," IEEE Computer Society, Jan./Feb. 2010, pp. 131-141.

Patterson, D.A. et al.: Computer Architecture a Quantitative Approach, $2^{nd}$ Ed., Morgan Kaufmann Publishers, Inc. 1996, pp. 654-693.

Sinharoy, et al., "POWER5 System Microarchitecture," IBM Journal of Research and Development—POWER 5 and packing. vol. 49, Jul. 2005, pp. 505-521.

Wu, et al., Hybrid Cache Architecture with Disparate Memory Technologies, ISCA '09 Proceedings of the $36^{th}$ Annual International Symposium on Computer Architecture, pp. 34-45.

Condit, Jeremy, et al. "Better I/O through byte-addressable, persistent memory," Proceedings of the ACM SIGOPS 22nd Symposium on Operating Systems Principles, ACM, 2009.

Mangalagiri, Prasanth, et al. "A low-power phase change memory based hybrid cache architecture," Proceedings of the $18^{th}$ ACM Great Lakes Symposium on VLSI. ACM, 2008.

Wu, Michael et al. "eNVy: a non-volatile, main memory storage system," ACM SigPlan Notices. vol. 29. No. 11. ACM, 1994.

Zhou, Ping, et al. "A durable and energy efficient main memory using phase change memory technology," ACM SIGARCH Computer Architecture News. vol. 37. No. 3, ACM, 2009.

Chinese Office Action dated Sep. 18, 2014 in corresponding Chinese Patent Application 201110303764.4, filed Sep. 29, 2011, 4 pages.

Chinese Office Action dated Jan. 9, 2015 in corresponding Chinese Application No. 201110303764.4, filed Sep. 29, 2011, 6 pages.

* cited by examiner

SECURITY PROTECTION FOR MEMORY CONTENT OF PROCESSOR MAIN MEMORY

REFERENCE TO RELATED APPLICATIONS

This application is a continuation of U.S. patent application Ser. No. 12/895,574, filed Sep. 30, 2010, entitled SECURITY PROTECTION FOR MEMORY CONTENT OF PROCESSOR MAIN MEMORY, which is hereby incorporated by reference in its entirety and made part of this specification.

BACKGROUND

1. Field

Subject matter disclosed herein relates to memory devices and security of same.

2. Information

Increasingly, memory devices may be implemented to store sensitive information, such as financial, medical, and/or personnel records, for example. Additionally, such memory devices may store information used to operate computing systems, such as executable code, system operating parameters, and so on. Unfortunately, such important and/or sensitive information may be targeted by increasingly sophisticated security attacks. For example, such an attack may involve unauthorized modifying, reading, and/or downloading of databases of financial records, contributing to identity theft.

Security technology may include techniques to authenticate operations of a memory device in order to prevent memory contents from being modified and/or read without passing a signature validation process, for example.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
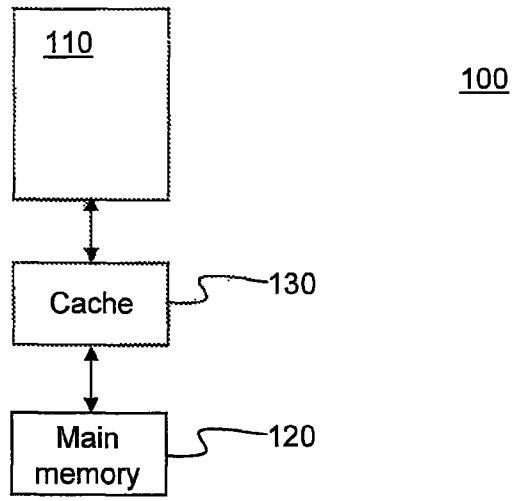
FIG. 1 is a schematic diagram of a system configuration, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments described herein may include main memory comprising persistent memory. For example, persistent memory may comprise nonvolatile memory such as phase change memory (PCM), NOR flash, and NAND flash. Accordingly, persistent main memory may comprise a memory array that includes nonvolatile memory. In one implementation, persistent main memory may include a memory array of which one portion comprises one or more types of nonvolatile memory and another portion comprises volatile memory, as described below. In another implementation, persistent main memory may include a memory array comprising only nonvolatile memory, though claimed subject matter is not so limited. Herein, main memory refers to memory that may be used by a processing entity to maintain one or more applications that are executable by the processing entity, though claimed subject matter is not limited in this respect. In an implementation, particular portions of main memory may be accessed by a processing entity by directly addressing such particular portions, for example. Direct addressing may comprise a process where a processing entity may issue an address to read a particular location in a memory, and the particular location is subsequently read. In contrast, indirectly addressing a memory may comprise a process that involves an input/output (I/O) device to which a processing entity may issue an address to read a particular location in a memory. In this case, the I/O device may respond by presenting (read) data that's in that particular location. For example, basic input/output system (BIOS) software may be stored on a non-volatile, read-only memory (ROM) and/or flash memory that are not accessible by direct addressing by a processing entity.

In an embodiment, a method of operating a memory system may include techniques for security checking objects loaded into a main memory of a processor. Such objects, for example, may comprise a write command and/or information associated with a write command to be written to main memory. Such techniques for security checking objects may involve a memory device capable of performing authenticated operations within the memory device. For example, a process of validating a security signature may be performed before contents of the memory device are modified. Security checking objects may involve performing secure hash algorithm (SHA) measurements and/or other cryptographic measurements. Though such measurements may be relatively time-consuming, embodiments described herein include methods and/or memory devices to improve efficiency of performing such cryptographic measurements. For example, efficiency may be improved by reducing the time it takes to perform such measurements and/or reducing operational demands placed on a processor-memory system. For example, if main memory comprises persistent memory, then cryptographic measurements may be performed less often while such measurements are stored in the nonvolatile memory.

In an embodiment, a system comprising a processing entity, such as a central processing unit (CPU), may include persistent main memory. For example, persistent main memory may comprise at least a portion of main memory and/or cache memory to be used by a CPU. Such a system, for example, may comprise a computing system to execute applications in any of a number of environments, such as computers, cell phones, PDA's, data loggers, and navigational equipment, just to name a few examples. In an implementation, such a system may include a resource manager for virtualization, such as a hypervisor, for example. In some examples, a main memory and/or cache memory may comprise a portion of persistent memory and a portion of other type of random access memory (RAM). In a particular example, main memory may include at least a portion of PCM and dynamic random access memory (DRAM). Such memory configurations may provide benefits such as non-volatility, relatively high program/read speeds, and/or extended PCM life, for example.

In one implementation, persistent main memory may provide a benefit of avoiding a need to re-determine information pertaining to, among other things, security protection of contents stored in the persistent main memory. Such information, for example, may comprise SHA measurements, cryptographic keys and/or signatures, and so on, as described below. In another implementation, persistent main memory may also provide a benefit of avoiding a need to re-load such security information from an external non-volatile memory into volatile DRAM, as described in detail below. Such re-determining and/or reloading security information may otherwise occur during a processor reboot process if security information is not maintained in persistent main memory, for example. Accordingly, improved security protection may be among a number of advantages provided by persistent main memory. Of course, such features and details of an embodiment that includes PCM or other persistent memory as a main memory are merely examples, and claimed subject matter is not so limited.

In an embodiment of a computing system, a processor may write information to a persistent main memory. Before being allowed to be written to the persistent main memory, however, such information may be analyzed to determine if such information comprises unauthorized portions. For example, such unauthorized portions of information, such as a computer virus, malware, and so on, may be harmful to the integrity of information already store in persistent main memory. Accordingly, analysis to determine if information comprises unauthorized portions may involve a security-check process. For example, a security-check process may include executing a SHA measurement and/or other cryptographic security measurement (e.g., MD5, SHA-1, SHA-256, just to name a few examples) of information before such information is loaded to persistent main memory. If it is determined that such information does not include unauthorized portions, such information may be allowed to be loaded to main memory RAM. If it is determined that such information does include unauthorized portions, such information may not be allowed to be loaded to main memory RAM. A security-check process may be relatively time consuming. In an implementation involving persistent main memory, such a security-check process need not be performed upon a re-boot of a computing system or upon a processor jump from user privilege up to supervisor/secure privilege, for example. In particular, security information, such as SHA measurements and/or other cryptographic measurements used in a security-check process, may be stored in persistent main memory If a processor and/or persistent main memory experience a power loss or other disruptive event, such measurements need not be lost from persistent main memory. Accordingly, such measurements and/or associated security information may be available subsequent to re-initializing (e.g., rebooting) the processor or upon a processor jump from user privilege up to supervisor/secure privilege.

In an embodiment, a method of operating a memory system may include receiving a write command in a main memory accessible by a processor, and determining authentication of the write command within the main memory. In other words, authentication of a write command and/or information associated with a write command may be performed by one or more electronic components located within a main memory, as described in detail below. For example, a location within a main memory may comprise a location within a single chip, on-die, stacked chips, and/or in an IC package. In an implementation, "within a main memory" may mean within a physical boundary that includes main memory and authentication logic that has an external interface to a controller, for example.

Though main memory may comprise persistent memory, such main memory need not comprise nonvolatile memory. For example, such main memory may comprise DRAM or other volatile memory. In a particular implementation, a method of operating a memory system may include determining, within the main memory, whether to modify contents of a main memory based, at least in part, on a determined authentication of a write command and/or information associated with a write command. For example, a main memory may receive a write command from a system bus operatively connecting the main memory to one or more processors. If such a write command is determined to not be authentic or otherwise unauthorized to modify the main memory or a portion thereof, then the write command may be ignored by the main memory. Of course, such details of a method of operating a memory system are merely examples, and claimed subject matter is not limited in this respect.

In an embodiment, a memory device may comprise a memory cell array and a controller located within the memory device. Upon such a controller receiving a write command to access the memory cell array, the controller may determine authentication of the write command. Though a memory cell array may comprise persistent memory, such a memory cell array need not comprise persistent memory. For example, such an array may comprise DRAM or other volatile memory. In a particular implementation, a controller may also determine whether to modify contents of a memory cell array based, at least in part, on a determined authentication of a write command and/or information associated with a write command. For example, a controller may receive a write command from a bus operatively connecting a memory device including the controller to one or more processors. If such a write command is determined to be authentic or otherwise authorized to modify the memory device or a portion thereof, then the controller may execute the write command. In an embodiment that includes persistent main memory, such a memory device may provide benefits such as maintaining information associated with authentication of a write command and/or information associated with a write command during power loss at the main memory and/or processor, for example. In such a case, cryptographic measurements associated with authentication need not be repeated if write commands from a same processor, for example, are received again. Of course, such details of a memory device are merely examples, and claimed subject matter is not limited in this respect.

FIG. 1 is a schematic block diagram of a processing system 100, according to an embodiment. Processing system 100 may comprise CPU 110, main memory 120, and/or cache 130. In particular, CPU 110 may host one or more applications maintained in main memory 120. Though not shown in FIG. 1, processing system 100 may comprise additional CPUs or other such processing entities, additional main memories, and/or additional caches. For example, CPU 110, main memory 120, and/or cache 130 may collectively comprise building blocks for larger multiprocessor systems. In one implementation, processing system 100 may operate using a memory hierarchy that includes one or more levels of cache memory. Any such level may comprise persistent memory shared among multiple CPUs. For example, cache memory may comprise first level cache and second level cache, either of which at least a portion may comprise persistent memory. In another implementation, processing system 100 may include a resource manager to allow multiple operating systems to run concurrently (e.g., hardware virtualization). Such a resource manager, for example, may comprise a hypervisor. Of course, such details of a processing system and cache memory are merely examples, and claimed subject matter is not so limited. In an embodiment, at least a portion of main memory 110 may comprise persistent memory. In a particular implementation, another portion of main memory 110 may comprise other types of memory, such as volatile DRAM. Portions of persistent memory need not be arranged contiguously in main memory 210, which may comprise one or more die structures, for example.

Figure 2:
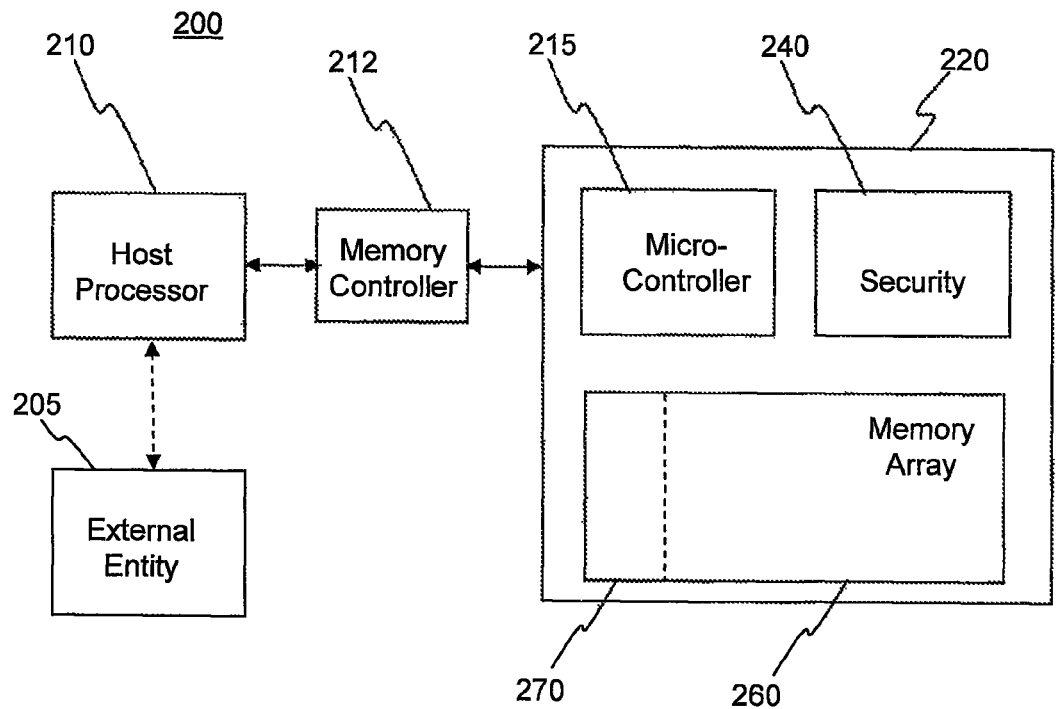
FIG. 2 is a schematic diagram of a processor-memory system, according to an embodiment.

FIG. 2 is a schematic view of a processor-memory system 200, according to an embodiment. Such a processor-memory system 200 may be included in a host device (not shown) such as personal digital assistant (PDA), mobile phone, computing device, and/or other electronic device, for example. A host processor 210 may be communicatively connected to a main memory 220 via a memory controller 212. In an implementation, memory controller 212 may be located externally to main memory 220, such as on a single die or IC package external to an IC or IC package that comprises main memory 220, for example. For example, host processor 210 may access main memory 220 to write information to main memory 220 or read information from main memory 220. In one implementation, an external entity 205, external to processor-memory system 200, may be communicatively connected to host processor 210. In a particular implementation, external entity 205 may communicate with host processor 210 wirelessly, for example. External entity 205 may comprise a server or similar computing device accessible via the Internet or a memory device such as flash memory, optical computer disk, or the like, for example. External entity 205 may also comprise executable code such as an electronic mail application. Host processor 210 and external entity 205 may communicate with main memory 220 independently of one another and/or at different times, though claimed subject matter is not so limited. As explained in further detail below, external entity 205 may be a source of computer virus, malware, and so on, which may comprise unauthorized commands to attempt to access main memory 220, though claimed subject matter is not limited in this respect. For example, external entity 205 may comprise a server for a website on the Internet that may be a source of a Trojan horse. In another example, external entity 205 may comprise an electronic mail application that may be used to unexpectedly open an email including a computer virus. In yet another example, external entity 205 may comprise a portable flash memory device that may unsuspectingly store a computer virus. In such cases, the presence of a Trojan horse, computer virus, and/or other malware may result in unauthorized attempts to access main memory 220.

Main memory 220 may comprise a memory array 260, micro-controller 215, and/or security portion 240. In one implementation, memory array 260 may comprise an array of addressable memory cells to which data may be written and/or from which data may be read. Memory array 260 may be partitioned into two or more portions such as sub portion 270, which may be reserved for maintaining security information provided by security portion 240, for example. In one implementation, sub portion 270 may store security information such as cryptographic hash values, signatures, keys, and the like. Particular memory locations in sub portion 270 may be used to maintain such security information corresponding to information stored in particular memory locations in memory array 260, for example. Determination of such hash values, signatures, keys, and the like, which may be used to authenticate a received write command, for example, may be performed within main memory 220, for example. Memory array 260 may comprise flash memory, PCM, and/or other persistent memory, just to name a few examples. In other embodiments, memory array 260 may comprise volatile memory, such as DRAM for example or a combination of persistent and volatile memory.

Security portion 240 may comprise logic circuit components and/or executable code maintained in memory array 260. Security portion 240 may authenticate and/or validate commands received from host processor 210 and/or external entity 205. Such authentication may involve techniques using security keys, for example. In one implementation, micro-controller 215 may receive write commands from host processor 210 (e.g., via memory controller 212) and subsequently invoke security portion 240 in order to authenticate and/or validate such received write commands. Upon such authentication, micro-controller 215 may allow access to memory array 260 using appropriate memory addressing, for example. In one implementation, micro-controller 215 may retrieve security information from security portion 240 and store such information in memory array 260. In particular, as explained above, security information may be stored in sub portion 270, which may comprise a portion of memory array 260 reserved for storing security information. Of course, such details of processor-memory system 200 are merely examples, and claimed subject matter is not so limited.

Figure 3:
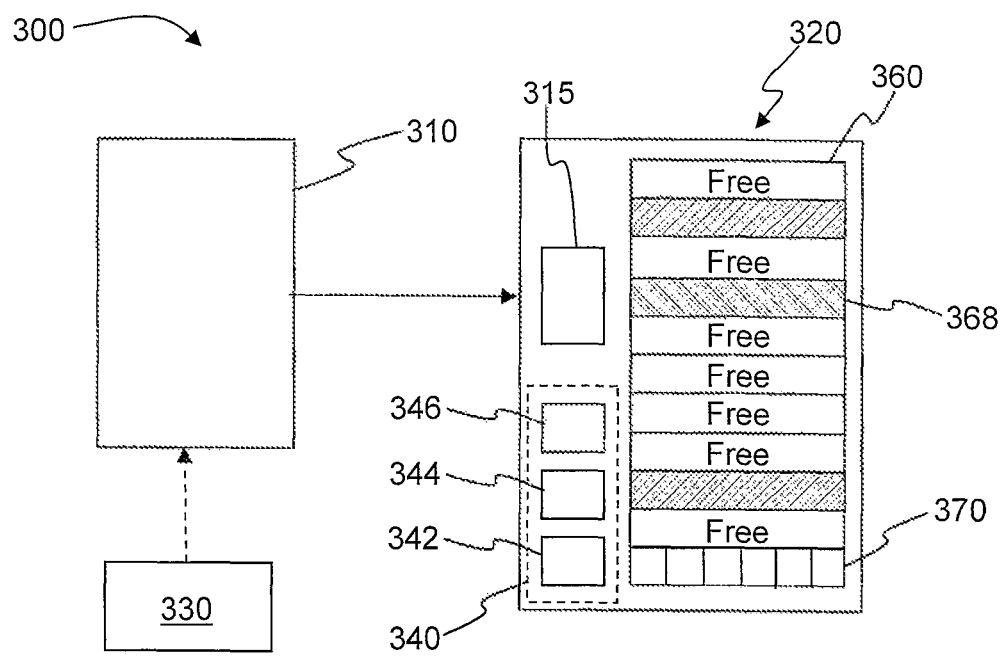
FIG. 3 is a schematic diagram of a processor-memory system, according to another embodiment.

FIG. 3 is a schematic block diagram of a processor-memory system 300, according to an embodiment. Such a processor-memory system may include any number of processing entities, though only one such entity is shown in FIG. 3. In a particular example, such a processing entity may comprise a CPU 310. In one implementation, CPU 310 may include local memory (not shown) comprising embedded persistent memory, for example. In another implementation, CPU 310 may access a main memory 320 that includes persistent memory. In particular, persistent memory may be included in a memory hierarchy comprising caches (e.g., various levels of cache) and main memory. At least a portion of such main memory, for example, may comprise PCM. Such a memory hierarchy may be used to manage a distributed memory comprising caches and main memory. CPU 310 (and other CPUs that may be present in a computing platform, for example) may share such a distributed memory. External memory 330, which may comprise flash memory, a hard-drive, an optical computer disk, just to name a few examples, may be communicatively connected to main memory 320 via CPU 310. Here, CPU 310 may transmit write commands to main memory 320 to transfer information from external memory 330 to main memory 320. Unfortunately, in some cases, such information may comprise unauthorized, perhaps malicious code, such as a computer virus, Trojan horse, and other malware, for example. As mentioned above, referring to FIG. 2, an external entity may comprise another source of such unauthorized code. As described herein, however, main memory 320 may be capable of implementing techniques to avoid writing such unauthorized information into main memory 320.

In one implementation, processor-memory system 300 may comprise a portion of a computing platform. In such an implementation, CPU 310 may include a cache memory (not shown) comprising a translation lookaside buffer (TLB), which may point to a particular page table that, in turn, may point to one or more individual pages of main memory 320. In an embodiment where main memory 320 comprises volatile memory, such as DRAM for example, memory contents of main memory 320 may be lost if power to CPU 310 and/or main memory 320 is interrupted and/or discontinued. On the other hand, in an embodiment where main memory 320 comprises persistent memory, such as PCM for example, memory contents of main memory 320 may be maintained even if CPU and/or main memory experience an interrupted and/or discontinued power source. In such a case, security information maintained in a portion of main memory 320, such as page 370 for example, need not be lost and may be available for subsequent authentication processes, as discussed in detail below. Of course, such details of a processor system are merely examples, and claimed subject matter is not so limited.

In an embodiment, main memory 320 may comprise a memory array 360, a memory controller 315, and a security portion 340. Memory array 360 may comprise one or more portions such as pages including, for example, pages 368 and 370. In a particular implementation, page 370 may comprise a memory location where at least a portion of security information may be stored, as described in detail below. Security portion 340 may include a security logic block 346, cryptographic key storage 344, and memory range identifier 342. For example, security logic block 346 may comprise any of a number of well-known cryptographic logic blocks, such as a SHA logic block. Cryptographic key storage 344 may comprise a register or other memory portion of memory array 360 to store one or more keys used for a process to authorize information. Accordingly, such keys may comprise information internal to main memory 320. Further, such keys may be private to the main memory 320 once provisioned. Cryptographic key storage 344 may comprise persistent memory to maintain a key, the value of which may be kept secret to users and/or electronic entities external to processor-memory system 300. In one implementation, processor 210 (FIG. 2) need not know such keys. In such a case, an external process or processor may be managing write operations, for example, so a local processor may pass thru commands and may be unaware of the keys. If local processor 210 is updating the secure area, then local processor 210 may know the keys. It is relatively less secure, however, for the local processor to know the local memory keys. It is more secure for an external authority to know the keys and to generate commands. In another implementation, processor 210 may know the keys. In such a case, if a hacker or other entity of a potential security breach, for example, gains access to processor 210, then such hacker or other entity may attain the key and may write to the memory. Security logic block 346 may utilize a key maintained in cryptographic key storage 344, as discussed in detail below. Memory range identifier 342 may comprise a register or other memory portion of memory array 360. Memory range identifier 342 may comprise persistent memory to maintain information describing and/or identifying one or more portions of memory array 360 that are to be security-protected. For example, memory range identifier 342 may comprise a register storing information that describes a range of pages that are not to be written to without performing an authorization process.

In an implementation, memory controller 315 may be configured to recognize a secure write command that may be used to write to a secure portion of main memory 320. Memory controller 315 may also be configured to recognize a memory measure command that may be used by the processor to re-measure and/or reconfirm authentication of at least a portion of memory contents, as discussed below.

Main memory 320 may verify write commands received at the main memory. Main memory 320 may prevent unauthorized modification to contents of main memory 320 so that such memory contents may continue to be valid and integrity protected. If main memory 320 comprises persistent memory, one or more processes involved in determining authorization of write commands need not be repeated upon a reinitialization of the processor-memory system 300. For example, once a data object is written to a persistent main memory using the secure write command, that memory object may be secure and integrity protected until it is overwritten.

Figure 4:
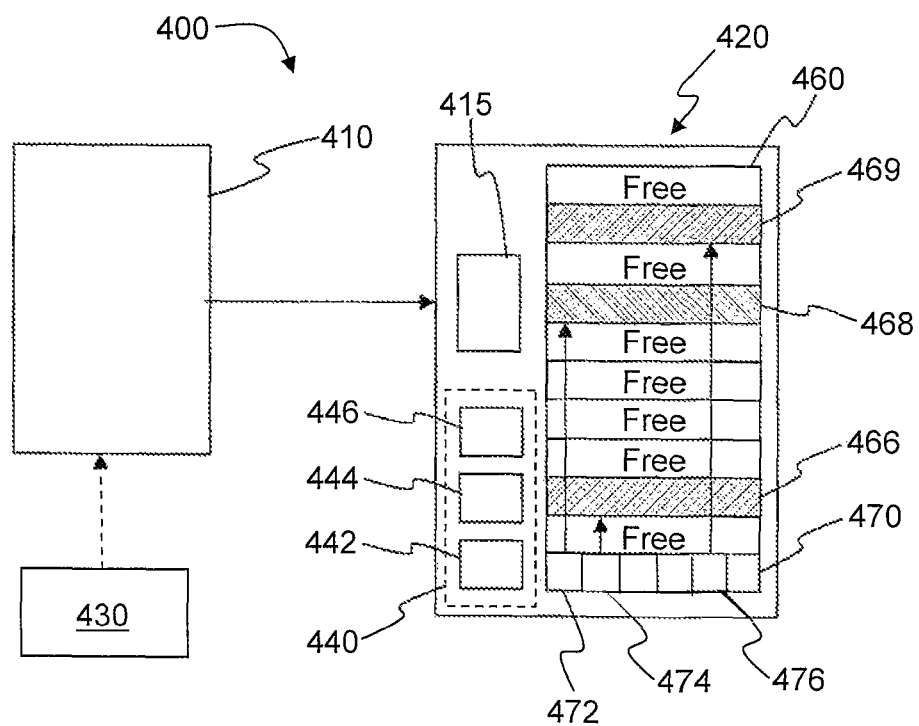
FIG. 4 is a schematic diagram illustrating a process of authenticating portions of main memory, according to an embodiment.

FIG. 4 is a schematic diagram of a process that may occur in a processor-memory system 400, according to an embodiment. Processor-memory system 400 may be similar to processor-memory system 300 described above, except that processor-memory system 400 may include a persistent main memory 420. Persistent main memory 420 may be accessible by CPU 410 that may be similar to CPU 310, as shown in FIG. 3, for example. In an embodiment, main memory 420 may comprise a memory array 460, a memory controller 415, and a security portion 440. Memory array 460 may comprise one or more portions such as pages including, for example, pages 468 and 470. In a particular implementation, page 470 may comprise a memory location where at least a portion of security information may be stored. Security portion 440 may include a security logic block 446, cryptographic key storage 444, and memory range identifier 442, which may be similar to security logic block 346, cryptographic key storage 344, and memory range identifier 342 described above.

In a particular implementation, and in the following description, persistent main memory 420 may comprise pages, though claimed subject matter is not so limited. For example, persistent main memory 420 may comprise multiple pages, including pages 470 and 468. In particular, page 470 may include an index table, which may comprise cryptographic hash values corresponding to particular individual pages in persistent main memory 420. In an implementation, such an index table may be located in a particular page in persistent main memory 420 to allow memory controller 415 to perform a process of re-validating a memory object, for example. Such a re-validation process may be performed upon request by CPU 410, wherein CPU 410 may transmit a memory-measure command to persistent main memory 420. For example, page 470 may include a hash value 472 corresponding to page 468, hash value 474 corresponding to page 466, hash value 476 corresponding to page 469, and so on. Such hash values may have been calculated during an earlier epoch, having been maintained in persistent main memory 420 even during power-down events, for example. Examples of re-validation processes are indicated in FIG. 4 by vertical arrows extending from page 470 to pages 466, 468, and 469. Though FIG. 4 indicates that cryptographic information such as hash values may be stored in page 470, claimed subject matter is not limited to such relative locations. For example, hash values may be located at page 468 or other page. Of course, such details of a persistent main memory are merely examples, and claimed subject matter is not so limited.

Figure 5:
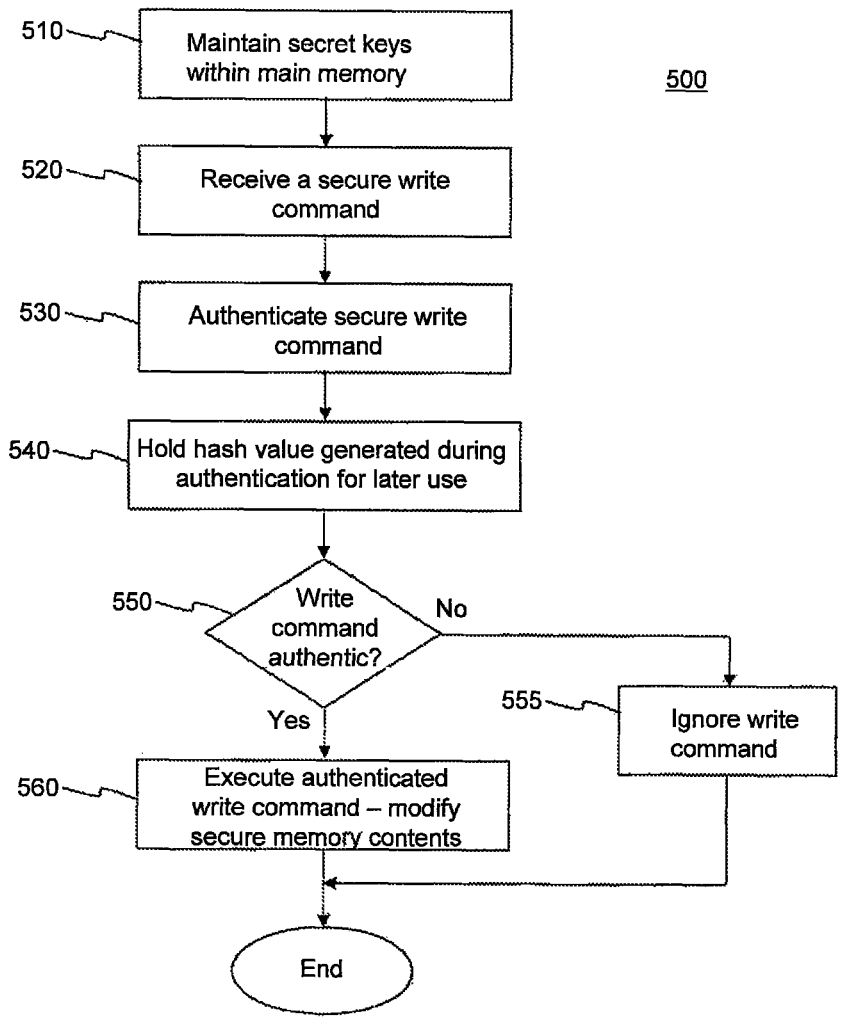
FIG. 5 is a flow diagram of a process to authenticate a write command in main memory, according to an embodiment.

FIG. 5 is a flow diagram of a process 500 to authenticate a secure write command. Such a process may be performed, for example, by processor-memory system 300 or 400, described above. At block 510, secret keys, comprising cryptographic values as described above, may be stored in one or more portions of a main memory. For example, such secret keys may be stored in cryptographic key storage 344, shown in FIG. 3. Maintaining such secret keys within a main memory may provide a benefit of improving security of memory contents, compared to a case where secret keys are stored external to a main memory. For example, in one implementation, such secret keys may not be modified and may be available to authentication logic from a known source. In another implementation, such secret keys may be modified in case there is a secure protocol for updating the secret keys. At block 520, a main memory may receive a secure write command. In an implementation, such a command may be received via a bus, for example, from a processor or memory controller external to the main memory. At block 530, a memory controller within the main memory may perform a process to authenticate the received secure write command. For example, such a memory controller within the main memory may be similar to memory controller 315 shown in FIG. 3. In an embodiment, such a process to authenticate a received secure write command may include applying a SHA engine on the secure write command and/or information associated with the secure write command. In one implementation, a microcontroller may be used to apply such a SHA engine, though claimed subject matter is not so limited. A secret key stored within the main memory may also be included in operations performed by the SHA engine. In one implementation, security logic block 346, shown in FIG. 3, may comprise a microcontroller and/or software to perform operations of such a SHA engine, though claimed subject matter is not so limited. Accordingly, a SHA engine may generate a cryptographic signature, such as a hash value, for example. Meanwhile, at block 540, such hash values may be stored in a portion of main memory, such as page 470, comprising an index of hash values, for example. At diamond 550, memory controller 315 may determine whether or not a secure write command is authentic. If not, then process 500 may proceed to block 555 where the write command is ignored. In such a case, for example, contents stored in a protected main memory may not be modified. If memory controller 315 determines that a secure write command is authentic, then process 500 may proceed to block 560 where the write command may be executed to modify contents stored in main memory. Of course, such details of process 500 are merely examples, and claimed subject matter is not so limited.

Figure 6:
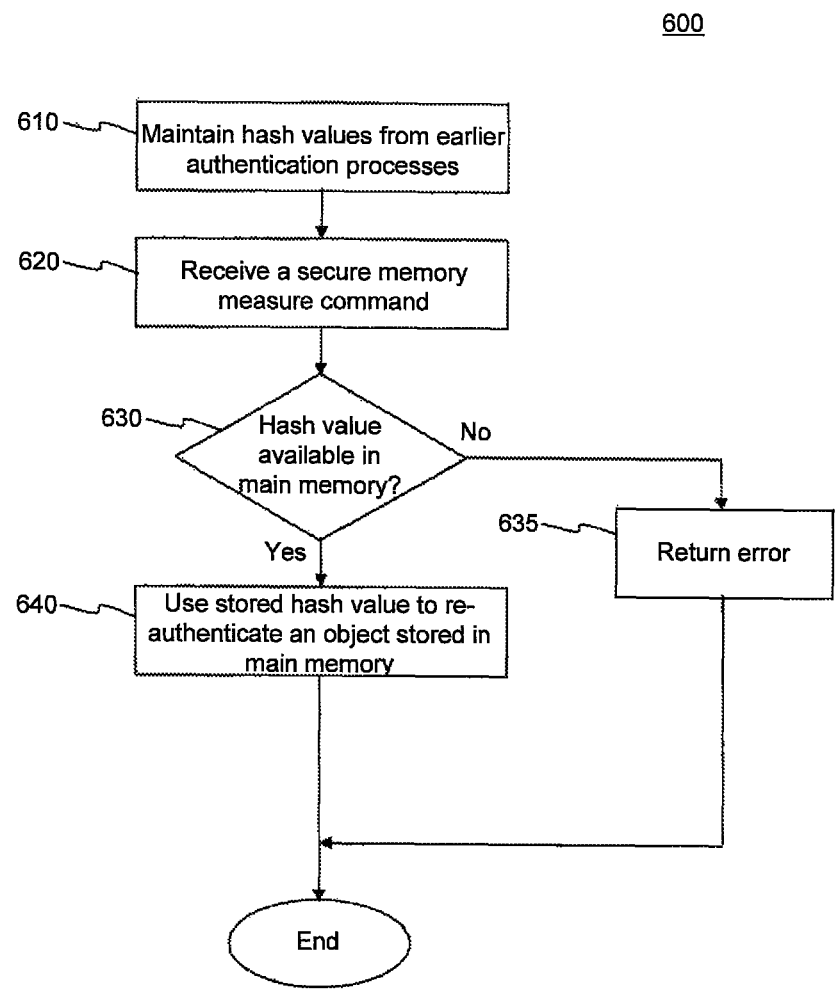
FIG. 6 is a flow diagram of a process to perform a secure memory measure command.

FIG. 6 is a flow diagram of a process 600 to perform a secure memory measure command. Such a process may be performed, for example, by processor-memory system 300 or 400, described above. At block 610, hash values, comprising results of previous cryptographic calculations as described above, may be stored in one or more portions of a main memory. For example, such hash values may be stored in page 470 comprising an index of such hash values corresponding to particular pages of main memory 420, shown in FIG. 4. Maintaining such hash values within a main memory may provide a benefit of improving efficiency (e.g., speed) of re-authenticating objects stored in main memory. At block 620, a main memory may receive a secure memory measure command. In an implementation, such a secure memory measure command may be received via a bus, for example, from a processor or memory controller external to the main memory. At diamond 630, a memory controller within the main memory may determine whether or not a hash value corresponding to a particular object specified by a secure memory measure command is already stored in main memory. For example, as mentioned above, memory controller 415 may search an index of hash values in page 470 of main memory 420, shown in FIG. 4. If such a hash value is already stored, then process 600 may proceed to block 640, where the already-stored hash value may be used to re-authenticate an object stored in main memory and specified by the secure memory measure command. On the other hand, if such a hash value is not available, then process 600 may proceed to block 635, where a return error may be generated. Of course, such details of process 600 are merely examples, and claimed subject matter is not so limited.

Figure 7:
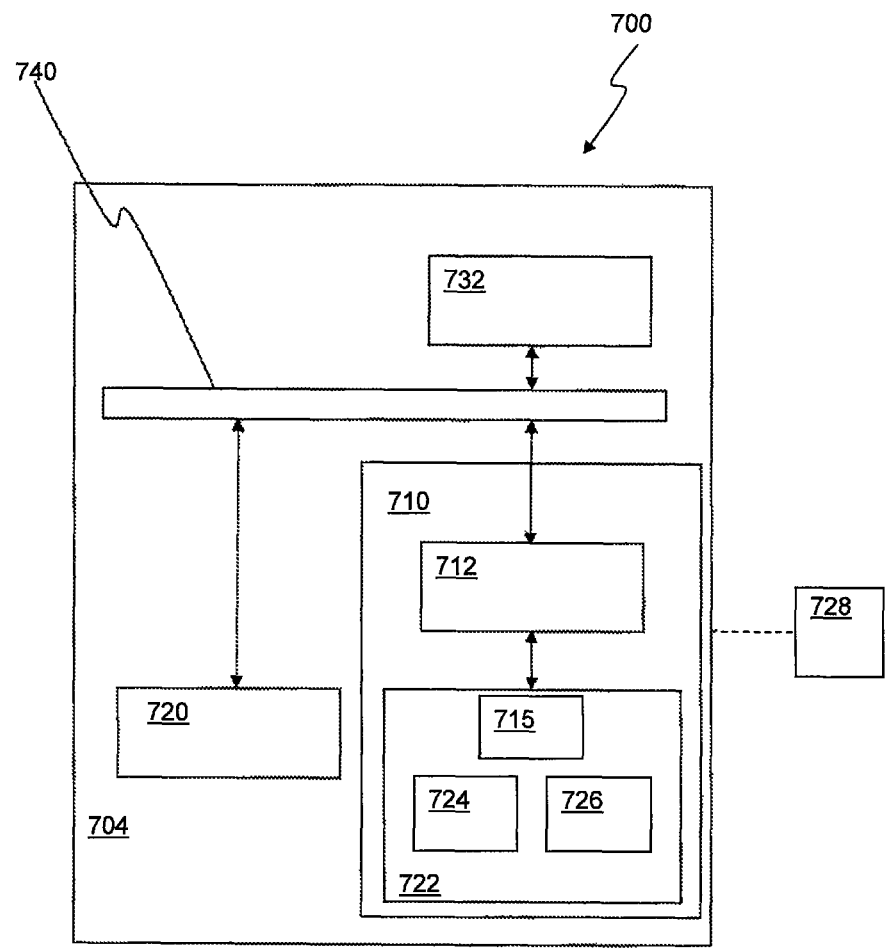
FIG. 7 is a schematic view of a computing system and a memory device, according to an embodiment.

FIG. 7 is a schematic diagram illustrating an exemplary embodiment of a computing system 700 including a memory device 710. A computing device 704 may be representative of any device, appliance, or machine that may be configurable to manage memory device 710. Memory device 710 may include a micro-controller 715 and a memory 722. In one implementation, micro-controller 715 may be physically located within memory 722. By way of example but not limitation, computing device 704 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

In an embodiment, computing device 704 may include one or more processing units 720 operatively coupled to memory 722 through a bus 740 and a host or memory controller 712. Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof. Processing unit 720 may communicate with memory controller 712 to process memory-related operations, such as read, write, and/or erase, as well as processor rebooting discussed above, for example. Processing unit 720 may include an operating system to communicate with memory controller 715. Such an operating system may, for example, generate commands to be sent to memory controller 715 over bus 740. Such commands may include read/write commands, for example. In one implementation, a hypervisor may allow one or more additional operating systems to run concurrently. For example, such a hypervisor may comprise a resource (e.g., memory 722, processing unit 720, and input/output 732) manager to allow for virtual environments.

Memory 722 may be representative of any data storage mechanism. Memory 722 may include, for example, a DRAM 724 and/or a persistent memory 726. In a particular embodiment, memory 722 may comprise a main memory that includes at least a portion of persistent memory, as described above. Memory 722 may also comprise cache memory that may likewise include at least a portion of persistent memory. While illustrated in this example as being separate from processing unit 720, it should be understood that all or part of DRAM 724 may be provided within or otherwise co-located/coupled with processing unit 720.

According to an embodiment, one or more portions of memory 722 may store signals representative of data and/or information as expressed by a particular state of memory 722. For example, an electronic signal representative of data and/or information may be "stored" in a portion of memory 722 by affecting or changing the state of such portions of memory 722 to represent data and/or information as binary information (e.g., ones and zeros). As such, in a particular implementation, such a change of state of the portion of memory to store a signal representative of data and/or information constitutes a transformation of memory 722 to a different state or thing.

In one embodiment, system 700 may comprise memory device 722 that includes a memory cell array and micro-controller 715 located within the memory device. Such a micro-controller may be similar to micro-controller 215 shown in FIG. 2, for example. System 700 may also comprise a processor 720 to host one or more applications and to issue write commands to access the memory cell array and memory controller 712 to receive the write commands. In one implementation, memory controller 712 may be located externally to the memory device and disposed between processor 720 and the memory device. Micro-controller 715 may receive write commands to access the memory cell array, determine authentication of the write commands, and determine whether to modify contents of the memory cell array based, at least in part, on the determined authentication of the write command. Such a memory cell array may comprise persistent memory such as PCM, for example.

Computing device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method, comprising:
   receiving a memory write command from a processor for writing to a location of a memory array of a main memory, wherein the main memory is directly addressable by the processor without using an input/output (I/O) device;
   providing a cryptographic key in response to receiving the memory write command, wherein the memory array comprises a persistent memory and wherein the cryptographic key is stored in the persistent memory;
   performing a cryptographic calculation using the cryptographic key for authenticating the write command;
   storing a result of the cryptographic calculation in the persistent memory; and
   authenticating a subsequent write command for writing to the location using the stored result.

2. The method of claim 1, wherein authenticating the subsequent write command comprises searching an index stored in the persistent memory, wherein the index is configured for storing results of cryptographic calculations.

3. The method of claim 1, further comprising storing the cryptographic key in a secure portion of the memory array.

4. The method of claim 3, further comprising updating the cryptographic key using a secure protocol.

5. The method of claim 1, wherein performing the cryptographic calculation comprises applying a secure hash algorithm (SHA).

6. The method of claim 5, wherein the result comprises a cryptographic signature generated by applying the secure hash algorithm using the cryptographic key.

7. The method of claim 1, wherein the authenticated information is maintained as valid until the authenticated information is overwritten.

8. The method of claim 1, wherein the persistent memory comprises phase change memory (PCM).

9. The method of claim 1, wherein storing the result of the cryptographic calculation comprises storing the result in the memory array.

10. A memory device, comprising:
    a memory array of a main memory, wherein the main memory is directly addressable by a processor without using an input/output (I/O) device; and
    a memory controller configured to:
      receive a memory write command from the processor for writing to a location within the memory array;
      provide a cryptographic key in response to receiving the memory write command, wherein the memo array comprises a persistent memory and wherein the cryptographic key is stored in the persistent memory;
      perform a cryptographic calculation using the cryptographic key for authenticating the write command;
      store a result of the cryptographic calculation in the persistent memory; and
      authenticate a subsequent write command for writing to the location using the stored result.

11. The memory device of claim 10, further comprising a security logic block, wherein the memory controller is further configured to apply a secure hash algorithm (SHA) stored in the security logic block for performing the cryptographic calculation.

12. The memory device of claim 10, wherein the persistent memory is configured to store an index table for results of cryptographic calculations corresponding to individual pages of the memory array.

13. The memory device of claim 12, wherein the memory controller is further configured to search the index table to authenticate the subsequent write command.

14. The memory device of claim 10, further comprising a memory range identifier storage portion for storing information to identify locations of the memory array for which an authentication process is performed prior to modifying stored information.

15. The memory device of claim 14, wherein the locations comprise a range of pages of the memory array.

16. The memory device of claim 10, further comprising a cryptographic key storage portion, wherein the cryptographic key storage portion comprises persistent memory.

17. A system, comprising:
    a memory array of a main memory, wherein the main memory is directly addressable by a processor without using an input/output (I/O) device;
    a memory controller configured to:
      receive a memory write command from the processor for writing to a location within the memory array;
      provide a cryptographic key in response to receiving the memory write command, wherein the memo array comprises a persistent memory and wherein the cryptographic key is stored in the persistent memory;
      perform a cryptographic calculation using the cryptographic key for authenticating the write command;
      store a result of the cryptographic calculation in the persistent memory; and
      authenticate a subsequent write command for writing to the location using the stored result; and a processor for providing the write command for writing to the location within the memory array.

18. The system of claim 17, wherein the persistent memory is configured to store an index table of results from cryptographic calculations, wherein each result corresponds to a page of the memory array.

19. The system of claim 18, wherein the memory controller is further configured to search the index table for authenticating the subsequent write command.

20. The system of claim 17, wherein the memory array comprises a persistent memory such that authenticated information is maintained as valid until the authenticated information is overwritten.

21. The system of claim 17, wherein the cryptographic key is inaccessible by the processor.

* * * * *